L. D. WOODRUFF.
GASKET RETAINING MEANS.
APPLICATION FILED OCT. 13, 1916.
1,306,043.
Patented June 10, 1919.
Fig. 1.
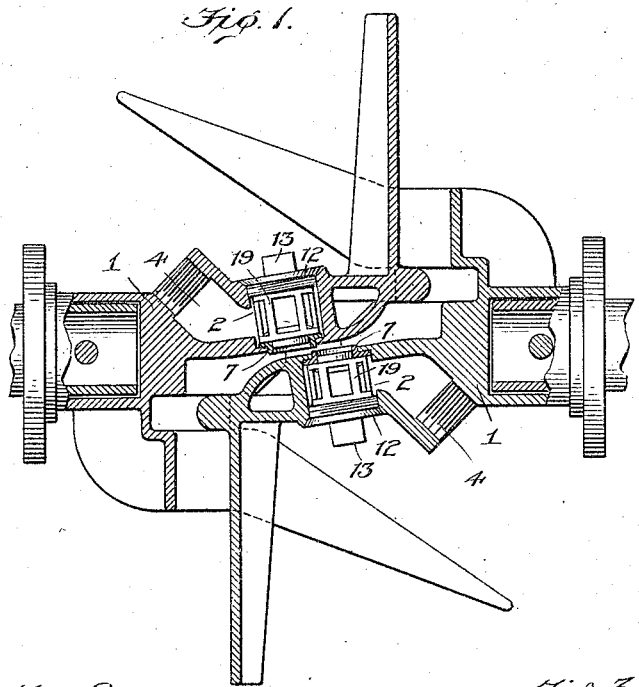
Fig. 2.
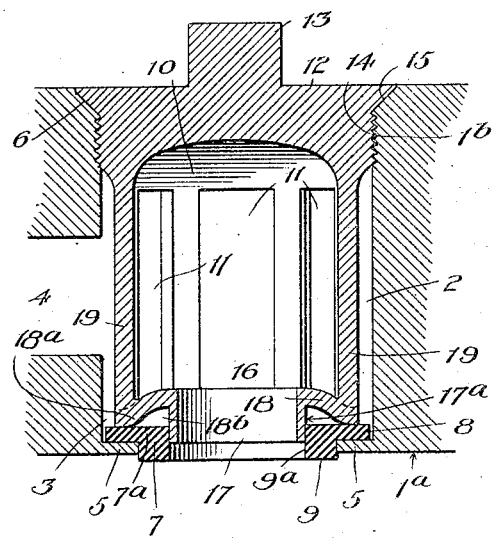
Fig. 3.
Inventor
Leonidas D. Woodruff
By Church & Church
his Attorneys

UNITED STATES PATENT OFFICE.

LEONIDAS D. WOODRUFF, OF NORWOOD, OHIO, ASSIGNOR TO UNION CONNECTOR COMPANY, OF WILMINGTON, DELAWARE, A CORPORATION OF DELAWARE.

GASKET-RETAINING MEANS.

1,306,043. Specification of Letters Patent. Patented June 10, 1919.

Application filed October 13, 1916. Serial No. 125,465.

*To all whom it may concern:*

Be it known that I, LEONIDAS D. WOODRUFF, a citizen of the United States, residing at Norwood, in the county of Hamilton and State of Ohio, have invented certain new and useful Improvements in Gasket-Retaining Means; and I do hereby declare the following to be a full, clear, and exact description of the same, reference being had to the accompanying drawings, forming part of this specification.

This invention relates generally to a gasket retaining means, more especially useful in connection with automatic fluid pressure coupler heads of the type disclosed in my prior Patent No. 1,190,062, granted to me July 4, 1916, although it will be understood that features of the invention are capable of useful application in all cases wherein it is desired to form a leakage tight coupling between the parts of pipe line systems.

An automatic coupler head of the type disclosed in my said prior patent is provided with a plurality of ports communicating respectively with the several pipe lines of a railway car. The head is designed to project beyond the front of a railway car and coöperate with another head of like construction mounted on an adjacent car, to effect automatic coupling of the several pipe lines when the heads are brought together and the several ports of the two coupler heads are brought into registry. In an automatic coupling of this character, it is essential that the ports in the coupler heads be provided with some means whereby a fluid-tight coupling is effected when coöperating coupler heads are coupled together. For this purpose it has been customary to mount in the ports of one coupler head gaskets which engage similar gaskets on the coöperating coupler head, when the parts are in coupled relation.

The present invention relates particularly to the means for retaining the gasket in the socket and the primary object is to provide an improved means for retaining the gasket firmly in its seat in the port, while the front or engaging face of the gasket is permitted to yield readily as pressure is brought on the front face, when in the act of coupling two heads together. By permitting the front face of the gasket to yield freely under pressure, danger of shearing off the front face of the gasket is greatly reduced and the life of the gasket is prolonged considerably. The novel construction for retaining the gasket in the port also greatly facilitates assembling and disassembling of the gasket with relation to the port in the coupler head.

Other objects are to generally improve a construction of this character, as will appear from the ensuing detail description of a structural embodiment of the invention in the preferred form. The novel features of the invention will be particularly pointed out and specified in the claims at the end of the specification.

In the drawings,—

Figure 1 is a horizontal sectional elevation of two automatic coupler heads in the act of coupling, they being of the type illustrated in my said prior patent and provided with the gasket and retaining means therefor constructed in accordance with the present invention.

Fig. 2 is an enlarged detail sectional view of the gasket and retaining plug, the view being in a horizontal plane through one of the ports of an automatic coupler head of the type illustrated in Fig. 1.

Fig. 3 is an elevation of a retaining plug and gasket, showing them in disassembled relation.

Like characters of reference in the several figures indicate the same parts.

In the construction illustrated in the accompanying drawings, wherein the gasket retaining means is utilized in connection with automatic fluid pressure couplings, a coupler head 1 is provided with a substantially cylindrical socket 2 communicating with a duct 4 which is adapted to be connected with one of the lines of a train pipe system, in a manner well understood in the art. At the port end 3 of the socket 2 the coupler head is provided with an annular retaining lip 5 projecting inwardly from the cylindrical socket wall and for a purpose which will hereinafter appear. The rear end of the socket 2 receives the plug, in assembling, and the wall adjacent the rear end is preferably beveled, as shown at 6, to form one member of a ground joint.

The gasket 7 is a ring constructed of rubber or any other approved elastic material. Said ring is provided with a lateral angular flange 8 adapted to seat behind the annular retaining lip 5 at the port end 3 of the socket in the head and also with an axially extending lip or flange 9 which, when the gasket is in position, lies parallel with the axis of the socket and projects beyond the front face of the coupler head.

For retaining the gasket 7 in its position at the port end of the socket in the head, an improved construction of plug is provided. As shown, the plug consists of a substantially cylindrical body made from suitable metal and having an interior chamber 10 provided with ports 11, one of the ports 11 being adapted to register with the duct 4 in the coupler head when the plug is in position. The rear head 12 of the plug is provided with a squared lug 13 adapted to receive a socket wrench and the cylindrical wall of the plug near the end 12 is provided with screw threads 14 for engagement with screw threads 1$^b$ formed in the wall of the socket in the coupler head. At the rear end, the cylindrical wall of the plug is beveled outwardly, as shown at 15, for engagement with the beveled portion 6 of the socket. The two beveled faces 6, 15 are ground and when the plug is screwed into position in the socket, said faces are brought into close engagement with each other, the joint being sufficiently tight to render unnecessary the employment of gaskets at the rear end of the socket. The front end of the plug is provided with a port 16 for the escape of fluid pressure from the train pipe line. This port 16 is surrounded by an axially-extending, forwardly-projecting, annular lip 17 connected by a lateral annular flange 18 with the middle wall 19 surrounding the chamber 10 of the plug. When the plug is in position, the lip 17 extends nearly to the front face of the coupler head, as shown in Figs. 1 and 2. The lip is of a proper diameter to receive the gasket 7, the inner cylindrical wall 9$^a$ of the gasket engaging the outer cylindrical face 17$^a$ of the lip. The gasket is retained in place by the lip and is prevented from bumping or twisting out of its proper position at the port end of the socket, or being pushed out of place on a tight fit. In addition it will be noted that, by reason of the engagement of the cylindrical walls respectively of the gasket and lip, the gasket is practically carried by the plug and therefore removal of the plug from the socket will carry with it the gasket. In this manner mounting or removal of the gasket with relation to the socket is greatly facilitated.

When it is desired to position the gasket in the port, the gasket may be slipped over the lip at the front end of the plug and the plug then screwed into place.

The lateral flange 18 extends outwardly from the inner end of the lip 17 at an angle to the plane of the gasket. The outer portion 18$^a$ near the periphery of the plug is adapted to press against the lateral flange 8 of the gasket adjacent the periphery of the latter. A triangular recess 18$^b$ is afforded between the front face of the flange 18 and the central portion 7$^a$ of the gasket. Thus, the axial central portion of the gasket may readily yield bodily under pressure on the front face of the axial flange 9, although no danger of displacing the gasket will arise, since the lateral flange 8 is firmly clamped against the retaining lip 5 by the outer portion of the flange 18 of the plug. This is quite an important feature, for the reason that the part of the gasket which is subjected to great pressure and excessive strain is allowed to yield back more than its natural resiliency will permit; or, in other words, this part of the gasket may yield bodily, without in any way affecting the proper position of the gasket at the port end of the socket. The life of the gasket will consequently be greatly prolonged, since shearing of the gasket will practically be obviated.

In Fig. 1 are illustrated two coupler heads as they come into coupling position. The front faces of coöperating gaskets are pressed against each other by the coupling movement of the coöperating heads. The diagonal disposition of the flange 18 at the front end of the plug permits the engaging faces of both of the gaskets to yield back bodily, when coupling is effected.

It will, of course, be understood, however, that the invention is by no means limited in its useful application to coupler heads of the type shown in the accompanying drawings. The features of the invention are useful in almost any situation where it is desired to effect fluid tight couplings between the parts of a pipe line system.

What is claimed is:

1. In combination, a fluid coupling member having a socket therein with a port at one end of the socket and provided with a retaining lip at the port end of the socket, a gasket seating against the retaining lip and a gasket retaining member within the socket having a flange adapted to engage the peripheral portion of the rear face of the gasket, and an axially extending lip adapted to engage the inner cylindrical wall of the gasket, whereby the central portion of the gasket may yield under pressure and removal of the retaining member from the socket will carry with it the gasket.

2. In combination, a fluid coupling member having a socket formed therein with a port at one end of the socket and provided with a retaining lip at the port end of the socket, a gasket having a lateral flange seating against the retaining lip and an axial flange extending parallel with the axis of the socket beyond the front face of the coupling member, and a plug adapted to be mounted within the socket having a flange for engagement with the lateral flange of the gasket near the periphery of the latter, and an axially extending lip for engagement with the inner cylindrical wall of the gasket, the face of the plug intermediate said points of contact being cut away whereby the front projecting face of the gasket may yield under pressure and removal of the plug from the socket will carry with it the gasket.

3. In combination, a fluid coupler member having a socket formed therein with a port at one end of the socket and provided with a retaining lip at the port end of the socket, a gasket having a lateral flange seating against the retaining lip and an axial flange extending parallel with the axis of the socket beyond the front face of the coupling member, and a plug adapted to be mounted within the socket having a diagonally extending lateral flange, the outer edge of which is adapted to engage the lateral flange of the gasket near the periphery of the latter, and the plug also having an axially extending retaining lip for engagement with the inner cylindrical wall of the gasket.

4. A cylindrical plug for the purposes herein set forth having at its rear end means whereby the plug may be mounted in a cylindrical socket, a chamber within the body of the plug, ports in the side walls of the plug communicating with said chamber, a diagonally extending lateral flange at the front end of said plug, the peripheral portion of which is adapted to engage the peripheral portion of a gasket, and a retaining annular lip on the front of the plug extending parallel with the axis of the plug for engaging the inner cylindrical wall of a gasket mounted on the end of the plug.

5. A plug substantially for the purposes herein set forth, comprising a body formed with an interior chamber, means at one end of said body for mounting the plug within a socket, ports in the side wall of the body communicating with said interior chamber, a diagonally extending flange at the front end of the body, and a retaining lip formed by an outwardly and axially extending annular member connected with said diagonal flange, the outer edge of the retaining lip lying beyond the outer extremity of the diagonally extending lateral flange, substantially as described.

6. The combination with an annular gasket, of a plug having an annular lip adapted to engage the inner cylindrical wall of the gasket, and a lateral flange for engagement with the rear face of the gasket, said lateral flange having a recess therein.

7. The combination with an annular gasket, of a plug having an annular lip adapted to engage the inner cylindrical wall of the gasket, and a lateral flange extending diagonally to the plane of the gasket and adapted to seat against the rear face of the gasket near the periphery of the latter.

8. The combination of a fluid coupler member having a retaining lip, a gasket having a lateral and an axial flange each adapted to seat against the retaining lip, and means for engagement with the flanges of the gasket to hold said flanges against the retaining lip while permitting the gasket to yield bodily inwardly under pressure.

9. In a coupler member having a port therein, the combination of a gasket seat, a gasket having a lateral and an axial flange each adapted to engage said seat, and means for retaining the axial flange and a portion of the lateral flange against the seat while permitting the gasket to yield bodily under pressure on the face of the coupler member.

LEONIDAS D. WOODRUFF.

Copies of this patent may be obtained for five cents each, by addressing the "Commissioner of Patents, Washington, D. C."